United States Patent Office 3,128,313
Patented Apr. 7, 1964

3,128,313
PREPARATION OF CONCENTRATED
FORMALDEHYDE
Carl Harding Manwiller and John Brockway Thompson, Wilmington, Del., assignors to E. I. du Pont de Nemours and Company, Wilmington, Del., a corporation of Delaware
No Drawing. Filed Dec. 22, 1960, Ser. No. 77,499
14 Claims. (Cl. 260—606)

This invention relates to the concentration of formaldehyde solutions, and, more particularly, to the preparation of concentrated formaldehyde solutions in alcohols by the distillation of the alcohol formaldehyde solution in the presence of distillation catalysts.

Formaldehyde is generally produced on a commercial basis by the air oxidation of methanol which gives a product containing mainly formaldehyde and water together with only minor amounts of unreacted methanol. Processes are known for removing water from such products and, thus, recovering a more highly concentrated formaldehyde. Little attention has been given, however, to processes for recovering concentrated formaldehyde from mixtures containing mainly formaldehyde and methanol with little or no water present. Such mixtures are obtained by the catalytic dehydrogenation of methanol as distinguished from the air oxidation of methanol. Alcoholic formaldehyde solutions are also obtained by the solution of formaldehyde or paraformaldehyde in an alcohol.

The prior art processes for the concentration of formaldehyde as a source of producing concentrated formaldehyde primarily relate to the treatment of aqueous solutions obtained from the air oxidation of methanol. Methanol solutions of formaldehyde as a source of producing concentrated formaldehyde have heretofore been of minor commercial importance. In research work precursing the present invention, it was found that almost pure methanol could be distilled out of the methanol-formaldehyde mixture at atmospheric pressure until the composition remaining in the stillpot mixture was about 65% formaldehyde. Increasing difficulty was encountered, however, in making an effective separation when further concentration of the formaldehyde was attempted. Larger amounts of formaldehyde tended to distill overhead with the methanol and the methanol recovery system became fouled with formaldehyde polymer. Similar contamination of the alcoholic distillate occurs in solutions of formaldehyde in other alcohols such as propanol, n-butanol, etc. In view of the utility of concentrated formaldehyde solutions, wherein the concentration of the formaldehyde is from 70 to 90% and higher, in such applications as the polymerization of formaldehyde to high molecular weight, polyoxymethylene resins, an economic process for the preparation of such solutions is highly desirable.

It is therefore an object of the present invention to provide a process for the concentration of formaldehyde solutions in alcohols and particularly in methanol. It is another object to provide a process for the concentration of formaldehyde obtained by the methanol dehydrogenation process. Still another object is to provide methanol solutions of better than 70% formaldehyde concentration. A further object of the present invention is to provide a process for the preparation of concentrated alcoholic formaldehyde by distillation of dilute formaldehyde solutions. Other objects of the present invention will be apparent hereinafter.

The objects of the present invention are accomplished by a process which comprises distilling an alcohol solution of formaldehyde through a distillation column containing as a catalyst a compound selected from the class consisting of organic and inorganic bases having a $pK_b$ value at 25° C. of greater than 5.15 and metal salts of an acid having a $pK_a$ value at 25° C. of greater than 3.0, and recovering a more concentrated solution of formaldehyde in said alcohol and a distillate comprising primarily alcohol. The concentration of formaldehyde in the solution to be concentrated will vary depending in part on the alcohol. Thus, in the case of methanol, in general, the concentration of the initial solution is less than 70% and the concentrate recovered has a concentration of greater than 70%. In the case of n-butanol the concentration of formaldehyde is increased from below 35% to above 35%; in the case of isopropanol and n-propanol from below 60% to above 60%. It is, however, also feasible, for example, to concentrate a 71% formaldehyde solution in methanol to an 85% formaldehyde solution in methanol by the process of the present invention, and, thus, concentrations are not critical from the standpoint of operability of the process discovered.

The following explanation is offered for a better understanding of the invention even though complete proof of its accuracy has not as yet been obtained. It has been postulated that the formaldehyde, when dissolved in an alcohol, forms a hemiacetal containing one or more units of formaldehyde depending on the concentration of the formaldehyde. An alcohol solution, when liquid, contains substantially no free formaldehyde and the formaldehyde is believed to exist almost completely in the form of a hemiacetal. It will be apparent that the formation of hemiacetal is in equilibrium with the dissociation of the hemiacetal back into the alcohol and formaldehyde. In dilute solution, the removal of alcohol has little effect on this equilibrium but as the concentration of the hemiacetal is increased and the boiling temperature rises, the concentration of free formaldehyde will increase and also more hemiacetal will vaporize. In the vapor form the described equilibrium is reversed so that substantially all of the hemiacetal dissociates into alcohol and formaldehyde. As a result, with increasing concentrations of formaldehyde the distillate will contain higher and higher concentrations of formaldehyde making straight distillation as a means of further concentration unfeasible. In any distillation, and particularly in adiabatic distillations, a portion of the condensate which is formed in the distillation condenser is returned to the distilling liquid, and therefore, a vapor-condensate mixture is always present in a distilling column. The present invention is based on the discovery that the presence of a base or a basic salt in the vapor-condensate zone of the distillation greatly reduces the concentration of the formaldehyde in the distillate. The explanation for this phenomenon is believed to be that the addition of base catalyzes the formation of the hemiacetal from formaldehyde dissolving from the vapor phase into the condensate phase. As a result of the action of the catalyst, the dissolved formaldehyde is rapidly transformed into the hemiacetal, thus allowing more of the vaporized formaldehyde to dissolve in the condensate. The preferred catalysts of the present invention are so efficient that substantially all of the formaldehyde released by the distilling solution is redissolved in the condensate dropping back into the distilling solution, so that the distillate contains only traces of formaldehyde or the hemiacetal and comprises mostly the alcohol. The foregoing explanation will also make it apparent why at higher reflux ratios improved results can be obtained with some of the less efficient catalysts. The compounds employed in the process of the present invention may, therefore, be truly termed "distillation catalysts."

The catalysts employed in the distillation process of the present invention are, as indicated above, organic and inorganic bases having a $pK_b$ of greater than 5.15 and basic metal salts, i.e., generally metal salts of acids, having a $pK_a$ of greater than 3.0. By "base" is meant any compound which on contact with water will release or cause the release of hydroxyl ions. The term "pK" is defined as the negative logarithm of the dissociation constant measured at 25° C.; when applied to bases it is calculated by the following formula $pK_b = 14.00 + \log K$, where K is the dissociation constant. There are, of course, bases and acids which dissociate in more than one step, the first step exhibiting a higher dissociation constant than any subsequent step. In the terms of this invention, it is only necessary for any one dissociation to meet the pK limits stated. The pK values and/or dissociation constants may be found in the International Critical Tables or other scientific publications for many of the basic compounds employed as catalysts in the present invention, and for those not found in such publications, the methods of measuring the pK and/or the dissociation constant at 25° C. are well known to skilled chemists. The subscript letters $a$ and $b$ indicate the acidic or basic nature of the dissociation constant.

The basic catalyts employed in the invention may be basic compounds which are soluble in the alcohol formaldehyde solution and volatilize with the alcohol formaldehyde vapors in which case they are added to the distilling solution. They may be solids or liquids which boil above the stillpot temperature, soluble in the alcohol-formaldehyde solution, in which case the catalyst in solution form is continuously added to the column head, trickled through the column and recycled; they may be insoluble solids in which case they are placed in the column with the column packing. The term "soluble" includes all compounds soluble in at least catalytic concentration, which is the only important criterion of solubility in the process described. It will be apparent that the insoluble solid catalysts of the present invention will result in relatively poor catalysis since the catalytic reaction is one occurring in the condensate phase. However, no matter which form the catalyst assumes, it is essential that the catalyst is present in the distillation column itself and not merely in the solution to be distilled. The metal salts employed in the present invention as catalysts are salts of weak organic acids, so that the overall effect of the addition of the salt to the system is that of a basic environment. The disadvantage of using metal salts is the ability of the acid formed on dissociation to cause undesirable side reactions. However, with the salts of the acids stated as suitable hereinabove, i.e., salts of acids having a $pK_a$ of greater than 3, these side reactions are greatly suppressed and do not significantly affect the operability of the process.

In view of the different forms the catalyst can assume, e.g., a volatile liquid, a non-volatile liquid, a soluble solid, an insoluble solid, including precipitates which may form on the column packing when soutions of metal salts are introduced, the concentration of the catalyst will vary widely. If the catalyst is dissolved in the condensate into which the vaporized formaldehyde is absorbed, the concentration will be in the range normal for catalysts, i.e., from 0.001 to 10 weight percent on the basis of the formaldehyde alcohol solution. Where the catalyst is in the form of an insoluble solid, the concentration can vary over an even greater range.

Specific examples of volatile catalysts are methylamine, ethylamine, n-butylamine, isobutylamine, n-hexylamine, cyclohexylamine, dimethylamine, diethylamine, di-n-butylamine, N-methyl-cyclohexylamine, trimethylamine, triethylamine, tri-n-propylamine, N,N'-dimethyl-cyclohexylamine, pyrrolidine, pyridine, 2-methyl pyridine, piperidine, N-ethylpiperidine, etc. Soluble non-volatile cataylsts are sodium acetate, sodium propionate, potassium butyrate, magnesium diacetate, sodium tetraborate, sodium citrate, sodium formate, barium hydroxide, potassium hydroxide, aluminum acetate, chromium acetate, cobalt acetate, lead acetate, manganese acetate, zinc acetate, triethylenediamine, sodium hydroxide, etc. Solid catalysts are in particular basic ion exchange resins, such as polyamines and quaternary ammonium type of resins. The latter type, however, frequently are unsuitable in that their use temtemperatures are below the column temperatures employed in the process of the present invention. In addition, it was also found that alumina is a catalyst even though its catalytitc activity is not high. The activity of alumina as a caalyst can be explained by the formation of basic aluminum formate on the surface of the alumina when contacted with the formaldehyde-alcohol solutions. The preferred catalysts employed in the process of the present invention are organic amines. Tertiary amines are especially preferred because of their superior ability to cause the concentration of formaldehyde and because they do not enter into undesirable side reactions with formaldehyde which can occur when primary or secondary amines are employed.

The process of the present invention may be employed for the separation of formaldehyde from a number of alcohols in which formaldehyde is soluble. With the higher alcohols it is perferred to carry out the distillation at reduced presusres. Examples of suitable alkanols of 1 to 4 carbon atoms are methanol, ethanol, n-propanol, isopropanol, n-butanol, and sec-butanol. The preferred application of the described process is the separation of formaldehyde solutions of alcohols having normal boiling points below about 130° C., particularly methanol, since methanol solutions are products in the synthesis of formaldehyde, and since solutions of formaldehyde in the lower alcohols have the widest ocmmercial utility. The process of the present invention is, furthermore, operable in the presnece of water and, thus, highly concentrated solutions of formaldehyde in water and alcohol, particularly methanol, can be obtained. The distillate in the distillation of such solutions will, of course, include water in addition to the alcohol. In water-containing solutions, it is preferred that the water content be kept below 30% by weight of the total mixture. This can be readily achieved by the addition of methanol to the solution to be distilled.

The distillation is carried out in accordance with known techniques employing known equipment. Any type of distillation column may be used, except that in the case of the solid catalysts, some means of supporting the catalysts should be provided, for example, by coating the catalyst onto a suitable type of column packing. It also is preferred to operate at high enough reflux ratios to give a reasonably pure alcohol condensate. The temperature of the boiling solution will vary with the concentration of the formaldehyde and also with the alcohol used. In the case of methanol solutions at atmospheric pressure, temperatures will vary from 65° C., the boiling point of methanol, to 120° C. for highly concentrated solutions of formaldehyde. The head temperature of the column is maintained as close as economically feasible to the boiling point of methanol. A suitable temperature range for the column head is from 65 to 80° C., and preferably from 68 to 70° C. in the case of methanol at atmospheric pressure.

The process of the present invention is further illustrated by the data in the tables given below. The data in these tables were obtained employing a column 20 mm. I.D., 40 cm. long, packed with 1/8" diameter glass helices. The boil-up rate was 3.0 ml./min. Unless otherwise stated, all distillations were carried out at atmospheric pressure. Percentages, unless otherwise identified, indicate weight percent of the total composition involved. The boil-up rate and reflux ratio were set and controlled by the standard methods commonly used in distillation work. The tables show the composition of the distillate at certain concentrations of formaldehyde in the distilling solutions, as determined from samples taken during the distillation. The tables also show the composition of the distillate in the absence of the catalysts employed in the process and, thus, illustrate the activity of the basic catalysts employed in the process. The high quantities of formaldehyde obtained in the distillate in a straight distillation point out the uneconomic results obtained when it is attempted to concentrate methanol solutions of formaldehyde by distillation without the catalysts discovered. It is apparent from these data that, even with the catalysts employed, the concentration of formaldehyde in the distillate will increase with increasing concentrations of formaldehyde. However, the increase in concentration is substantially smaller when distillation catalysts are employed. The increase in the formaldehyde content of the distillate can also be reduced by increases in the reflux ratio or by carrying out the distillation at reduced pressure. The most suitable reflux ratio and operating pressure will be a question of economics and depends on the circumstances in which the catalytic distillation of the present invention is employed.

Examples 1 to 7 in Table I show the use of volatile basic catalysts added to the distilling solution. Example 6 shows the use of a catalyst having a borderline $pK_b$ value. Examples 4 and 5 show the effect of base concentration. Example 7 shows that a very high concentration of formaldehyde can be readily obtained.

the packed columns were treated with NaOH solution and washed according to the procedures recommended by the resin manufacturers to assure that the resins were in the basic form. In the case of alumina, the column was filled with 1/8" alumina spheres. The catalytic activity of alumina is explained by the formation of basic aluminum formate on the alumina.

*Table II*

| Example | Packing | Wgt. percent HCHO in Stillpot | Wgt. percent HCHO in Distillate (Reflux Ratio 3:1) |
|---------|---------|------|------|
| 8 | Glass (control) | 73 | 31.4 |
| 9 | "Dowex" 3 on glass | 72 | 15.9 |
| 10 | "Amberlite" IR 45 on glass | 72 | 25.8 |
| 11 | Alumina | 72 | 13.2 |

Table III shows the result obtained with non-volatile catalysts. The catalyst solutions, the strengths of which are indicated in the table, were fed into the system at the top of the column at a rate of 0.65 ml./min. In Example 12 only pure methanol was added to the column.

*Table III*

| Example | Catalyst Feed Stream | Catalyst Concentration in Feed to Top of Column, Moles/liter | Wgt. Percent HCHO in Stillpot | Wgt. Percent HCHO in Distillate (Reflux ratio 3:1) |
|---------|---------------------|------|------|------|
| 12 | None (Pure MeOH) | 0 | 73 | 25.2 |
| 13 | Sodium Acetate | 0.1 | 73 | <0.1 |
| 14 | Sodium tetraborate | 0.1 | 73 | <0.1 |
| 15 | Sodium citrate | 0.01 | 73 | 5.7 |
| 16 | Sodium formate | 0.1 | 73 | <0.1 |
| 17 | Barium hydroxide | 0.1 | 73 | 1.0 |
| 18 | Chromium acetate | 0.1 | 73 | 4.6 |
| 19 | Cobalt acetate | 0.1 | 73 | <0.1 |
| 20 | Lead acetate | 0.1 | 73 | <0.1 |
| 21 | Manganese acetate | 0.1 | 74 | 2.2 |
| 22 | Zinc acetate | 0.1 | 74 | 0.09 |
| 23 | Triethylene diamine [1] | 0.5 | 73 | 2.2 |
| 24 | Sodium hydroxide | 0.5 | 73 | 0.02 |
| 25 | do | 0.5 | 78.5 | 9.8 |
| 26 | Pure methanol-coated column [2] | 0 | 73 | 3.9 |
| 27 | do [3] | 0 | 76 | 5.9 |

[1] $pK_b$ values of $K_1$—7.60 and $K_2$—3.95.
[2] Column coated with residue deposited by cobalt acetate (Example 19).
[3] Column coated with residue deposited by barium hydroxide solution (Example 17).

Table IV shows in Example 28 the production of a

*Table I*

| Examples | Catalyst | | Wgt. Percent HCHO in Still-pot | Wgt. Percent HCHO in Distillate | | | Base Strength of Catalyst, $pK_b$ [2] |
|---|---|---|---|---|---|---|---|
| | Material | Conc. in Still-pot, Moles/liter | | 1:1 Reflux Ratio | 1:1 Reflux Ratio | 5:1 Reflux Ratio | |
| 1 | None | | 73 | 36.2 | 31.4 | 18.8 | |
| 2 | Triethylamine | 0.013 | 73 | 26.8 | 3.0 | <0.1 | 10.75 |
| 3 | N-ethyl peperidine | 0.033 | 73 | 34.2 | 3.3 | <0.2 | 10.41 |
| 4 | Tri n-propylamine | 0.040 | 73 | | 4.8 | | 10.70 |
| 5 | do | 0.010 | 73 | | 14.1 | | 10.70 |
| 6 | Pyridine | 0.090 | 73 | 35.1 | [1] 24.0, 17.6 [1] 3.0 | 12. | 5.15 |
| 7 | N-ethyl piperidine | 0.031 | 78.5 | | | | 10.41 |

[1] Reflux ratio 4:1.
[2] $pK_b = 14.00 + \log K$, where K is the dissociation constant.

Table II shows results obtained with solid catalysts not soluble in the condensate. The "Dowex" 3 and "Amberlite" IR 45 are polyamine ion exchange resins containing primary, secondary and tertiary amine groups attached to a styrene divinyl benzene copolymer. In the distillation runs described in Table II, 10 g. of the resin-packing indicated was added to the packing of 1/8" diameter glass helices. Prior to use in the distillation experiments, 76% formaldehyde solution in methanol starting with a 52.7% solution. Examples 29 to 31 demonstrate the process of the present invention as applied to other alcohols. Table IV also shows in Examples 32 and 34 that the catalysts of the present invention are effective in the water distillation of formaldehyde, but that the catalysts are substantially more effective for the methanol distillation of formaldehyde.

Table IV

| Example | Solvent | Pressure, mm. Hg | Catalyst | Catalyst Concentration in Stillpot, moles/l. | Wt. Percent HCHO in Pot | | Pot Temperature in °C. | | Wt. Percent HCHO in Distillate | Reflux Ratio |
|---|---|---|---|---|---|---|---|---|---|---|
| | | | | | Initial | Final | Initial | Final | | |
| 28 | Methanol | 760 | N-ethyl piperidine | 0.02 | 52.7 | 76.6 | 95.1 | 109.4 | 4 to 10 | 0.5:1 to 4:1 |
| 29 | n-butanol | 376 | Tri-n-propyl amine | 0.02 | 32.5 | | 105.1 | | 23 | 5:1 |
| 30 | isopropanol | 758 | N-ethylpiperidine | 0.02 | 33.8 | 52.3 | 96.8 | 104.3 | 2.0 | 1:1 to 2:1 |
| 31 | n-propanol | 762 | ___do___ | 0.02 | 52.2 | | 113.4 | | 19.9 | 4:1 |
| 32 | water | 374 | None | | 39.6 | | 83.6 | | 15.1 | 3:1 |
| 33 | ___do___ | 374 | Triethyl amine | 0.06 | 40.0 | | 83.3 | | 13.9 | 3:1 |

Table V shows the simultaneous dehydration and concentration of a methanol-water-formaldehyde solution. In this run the stillpot was charged initially with the indicated solution. The feed stream was added slowly and continuously to the midpoint of the column, and the distillate was withdrawn continuously. The product was allowed to accumulate in the stillpot and was recovered at the conclusion of the run. Of the water entering with the feed, only about ⅛ appeared in the dehydrated product.

Batchwise dehydrations were carried out on solutions containing less water than in the feed of the example shown in Table V. A methanol-formaldehyde solution was dehydrated from 0.85% water to 0.05% water. At the same time, the solution was concentrated from 53 to 77% formaldehyde. Similarly, an isopropanol-formaldehyde solution was dehydrated from 0.33% to 0.020% water, while the formaldehyde concentration increased from 34 to 52%. Both runs were made at one atmospheric pressure with N-ethyl piperidine as the catalyst.

Table V

| Component | Initial Charge | | Feed Stream | | Distillate | | Porduct Recovered From Stillpot | | Net Gain or (Loss) | | Gain (Loss) to Side Reaction[1] | | Gain (Loss) Not Accounted For, Grams |
|---|---|---|---|---|---|---|---|---|---|---|---|---|---|
| | Wgt. Percent | Wgt., g. | Wgt. Percent | Wgt., g. | Wgt. Percent | Wgt., g. | Wgt. Percent | Wgt., g. | Grams | Moles | Grams | Moles | |
| Formaldehyde | 59.7 | 266.3 | 44.6 | 102.6 | 10.0 | 22.6 | 72.3 | 304.4 | (41.9) | (1.4) | (41.9) | (1.4) | 0 |
| Water | 0.11 | 0.5 | 28.5 | 65.5 | 19.67 | 44.4 | 2.03 | 8.6 | (13.0) | (0.72) | (8.5) | (0.47) | (4.5) |
| Methanol | 39.19 | 174.7 | 25.2 | 58.0 | 68.57 | 155.0 | 25.01 | 105.3 | 27.6 | 0.86 | 29.7 | 0.93 | (2.1) |
| Formic Acid | 0.1 | 0 | 0.14 | 0.3 | 0.41 | 0.9 | 0.06 | 0.2 | 0.8 | 0.017 | 0 | 0 | 0.8 |
| Triethylamine | 1.0 | 4.5 | 1.56 | 3.6 | 1.35 | 3.1 | 0.60 | 2.5 | (2.5) | | 0 | 0 | (2.5) |
| Carbon Dioxide | | | | | | | | | | | 20.7 | 0.47 | |
| Total | | 446 | | 230 | | 226 | | 421 | | (29) | 0 | | (8.3) |

[1] Side reaction: $3HCHO + H_2O \longrightarrow 2CH_3OH + CO_2$. Side reaction calculations are based on formaldehyde balance.

The concentrated formaldehyde solutions obtained by the process of the present invention are particularly useful for the conversion of the formaldehyde into polyoxymethylenes, for use in the plastics industry, and are also useful as reactants in many organic processes known to the art.

Another extremely valuable use for the process of the present invention comprises the use of the distillation catalysts in the methanolic polymerization of formaldehyde. In such polymerizations it is essential to maintain the concentration of formaldehyde at a constant level throughout the polymerizaiton. This is accomplished by polymerizing formaldehyde under constant pressure-temperature conditions while distilling off methanol using the baisc catalysts to prevent formaldehyde from distilling with the methanol. As a result of such an arrangement, the excess methanol formed by the polymerization of formaldehyde, tending to reduce the concentration, is continuously removed without further decreasing the formaldehyde concentration. Methanolic formaldehyde can be continuously added and polyoxymethylene continuously removed.

We claim:

1. A process of producing concentrated solutions of formaldehyde in alcohol which comprises distilling a solution of formaldehyde in an alcohol selected from the class consisting of alkanols of 1 to 4 carbon atoms and mixtures of said alkanols with water containing up to 30% by weight of the total composition of water, through a distallation column containing as catalyst a compound selected from the class consisting of inorganic and organic bases having a $pK_b$ at 25° C. of greater than 5.15 and metal salts of acids having a $pK_a$ at 25° C. of greater than 3, and recovering a more concentrated solution of formaldehyde in said alcohol.

2. The process as set forth in claim 1 wherein the alcohol is methanol.

3. A process of producing concentrated solutions of formaldehyde in alcohol which comprises distilling a solution of formaldehyde in an alcohol selected from the class consisting of alkanols of 1 to 4 carbon atoms and mixtures of said alkanols with water containing up to 30% by weight of the total composition of water, through a distallation column containing as a catalyst from 0.001 to 10 weight percent, on the basis of the condensate in the column, of an organic base having $pK_b$ at 25° C. of greater than 5.15, soluble in said solution of formaldehyde, and recovering a more concentrated solution of formaldehyde in said alcohol.

4. A process of producing concentrated solutions of formaldehyde in alcohol, which comprises distilling a solution of formaldehyde in an alcohol selected from the class consisting of alkanols of 1 to 4 carbon atoms and mixtures of said alkanols with water containing up to 30% by weight of the total composition of water, through a distillation column containing as a catalyst from 0.001 to 10 weight percent, on the basis of the condensate in the column, of an inorganic base having a $pK_b$ at 25° C. of greater than 5.15, soluble in said solution of formaldehyde, and recovering a more concentrated solution of formaldehyde in said alcohol.

5. A process of producing concentrated solutions of formaldehyde in alcohol which comprises distilling a solution of formaldehyde in an alcohol selected from the class consisting of alkanols of 1 to 4 carbon atoms and mixtures of said alkanols with water containing up to 30% by weight of the total composition of water, through a distillation column containing as a catalyst from 0.001 to 10 weight percent, on the basis of the condensate in the column, of a metal salt of an acid having a $pK_a$ at 25° C. of greater than 3, soluble in said solution of formaldehyde, and recovering a more concentrated solution of formaldehyde.

6. The process of claim 7 wherein the organic base is an amine.

7. The process of claim 6 wherein the amine is a trialkylamine.

8. The process of claim 7 wherein the trialkylamine is triethylamine.

9. The process of claim 7 wherein the trialkylamine is tri-n-propylamine.

10. The process of claim 6 wherein the amine is N-ethylpiperidine.

11. The process of claim 6 wherein the amine is triethylenediamine.

12. The process of claim 4 wherein the inorganic base is sodium hydroxide.

13. The process of claim 5 wherein the metal salt is an alkali metal salt.

14. The process of producing concentrated solutions of formaldehyde in alcohol, which comprises distilling a solution of formaldehyde in an alcohol selected from the class consisting of alkanols of 1 to 4 carbon atoms and mixtures of said alkanols with water containing up to 30% by weight of the total composition of water, through a distillation column containing a solid, insoluble in said solution of formaldehyde, containing basic groups, having a $pK_b$ at 25° C. of greater than 5.15, and recovering a more concentrated solution of formaldehyde in said alcohol.

References Cited in the file of this patent

Blair et al.: Jour. Chem. Soc., vol. 127 (1925), pp. 26–40.

UNITED STATES PATENT OFFICE
CERTIFICATE OF CORRECTION

Patent No. 3,128,313                              April 7, 1964

Carl Harding Manwiller et al.

It is hereby certified that error appears in the above numbered patent requiring correction and that the said Letters Patent should read as corrected below.

Column 2, line 43, before "hemiacetal" insert -- the --; column 3, line 46, for "catalyts" read -- catalysts --; column 4 line 34, for "actalytitc" read -- catalytic --; line 35, for "caalyst" read -- catalyst --; line 50, for "presusres" read -- pressures --; line 60, for "presnece" read -- presence --; columns 5 and 6, Table I, the second sub-heading under "Wgt. Percent HCHO in Distillate", for "1:1 Reflux Ratio" read -- 3:1 Reflux Ration --; same Table I, Example 3, under the sub-heading "Material", line 3, for "N-ethyl peperidine" read -- N-ethyl piperidine --; columns 7 and 8, Table V, the portion of the table under the heading "Net Gain or (Loss)" should appear as shown below instead of as in the patent:

| Net Gain or (Loss) | |
|---|---|
| Grams | Moles |
| (41.9) | (1.4) |
| (13.0) | (0.72) |
| 27.6 | 0.86 |
| 0.8 | 0.017 |
| (2.5) | - |
| - | - |
| (29) | | column 7, line 65, for "polymerizaiton" read -- polymerization --; column 8, lines 23 and 55, for "distallation" read -- distillation --; same column 8, line 57, before "$pK_b$" insert -- a --; column 9, line 10, for the claim reference numberal "7" read -- 3 --.

Signed and sealed this 8th day of September 1964.

(SEAL)
Attest:

ERNEST W. SWIDER                          EDWARD J. BRENNER
Attesting Officer                       Commissioner of Patents